US008424051B2

(12) United States Patent
Van Noetsele

(10) Patent No.: US 8,424,051 B2
(45) Date of Patent: Apr. 16, 2013

(54) ENHANCEMENT FOR INTERACTIVE TV FORMATTING APPARATUS

(75) Inventor: Robert Van Noetsele, Middelbeers (NL)

(73) Assignee: UPC Broadband Operations BV, Schiphol-Rijk (NL)

( * ) Notice: Subject to any disclaimer, the term of this patent is extended or adjusted under 35 U.S.C. 154(b) by 2202 days.

(21) Appl. No.: 10/383,932

(22) Filed: Mar. 7, 2003

(65) Prior Publication Data

US 2003/0200552 A1 Oct. 23, 2003

(30) Foreign Application Priority Data

Mar. 7, 2002 (GB) .................................. 0205401.3

(51) Int. Cl.
*H04N 7/173* (2011.01)
(52) U.S. Cl.
USPC ............................ 725/114; 725/109; 725/118
(58) Field of Classification Search .................. 725/109, 725/114, 118, 135, 138, 144, 148; 717/136–137; 715/522, 523
See application file for complete search history.

(56) References Cited

U.S. PATENT DOCUMENTS

| | | | | |
|---|---|---|---|---|
| 6,549,922 | B1 | 4/2003 | Srivastava et al. | 707/205 |
| 7,020,839 | B1 * | 3/2006 | Hosoda | 715/523 |
| 2001/0056460 | A1 * | 12/2001 | Sahota et al. | 709/201 |
| 2002/0111876 | A1 * | 8/2002 | Rudraraju et al. | 705/26 |
| 2002/0120940 | A1 | 8/2002 | Willard | 725/91 |
| 2002/0170067 | A1 * | 11/2002 | Norstrom et al. | 725/109 |
| 2003/0066081 | A1 * | 4/2003 | Barone et al. | 725/80 |

FOREIGN PATENT DOCUMENTS

| | | |
|---|---|---|
| EP | 1073223 A1 | 1/2001 |
| EP | 1244309 A1 | 9/2002 |
| FR | 2809844 A1 | 12/2001 |
| WO | WO-00/72574 A2 | 11/2000 |
| WO | WO-01/77842 A1 | 10/2001 |
| WO | WO-01/82139 A1 | 11/2001 |

OTHER PUBLICATIONS

Lauren Wood; "Programming the Web: The W3C DOM Specification"; IEEE Internet Computing Jan./Feb. 1999; XP-002163911; pp. 48-54.
C. Freytag et al.; "Resource Adaptive WWW Access for Mobile Applications"; Computers & Graphics 23 (1999); XP-4187832A; pp. 841-848.
Jörg Heuer et al.; "Adaptive Multimedia Messaging Based on MPEG-7—The $M^3$-Box"; XP-002201575; Siemens corporate Technology; Mobile Multimedia Systems & Applications; Nov. 9-Oct. 2000; pp. 6-13.

* cited by examiner

*Primary Examiner* — John Schnurr
(74) *Attorney, Agent, or Firm* — Harrington & Smith

(57) ABSTRACT

A signal formatting apparatus for use in a television transmission system, the apparatus comprising: an enhanced content input for receiving enhanced content streams in a predefined input format; a plurality of enhanced content outputs for outputting enhanced content data in a plurality of formats for transmission to receivers of respective types; and a signal formatter for forming the enhanced content data by processing the enhanced content streams to put each of the enhanced content streams in the respective format.

12 Claims, 3 Drawing Sheets

ENHANCEMENT FOR INTERACTIVE TV FORMATTING APPARATUS

This invention relates to television transmission systems, and in particular to signal formatting within television transmission systems.

Figure 1:
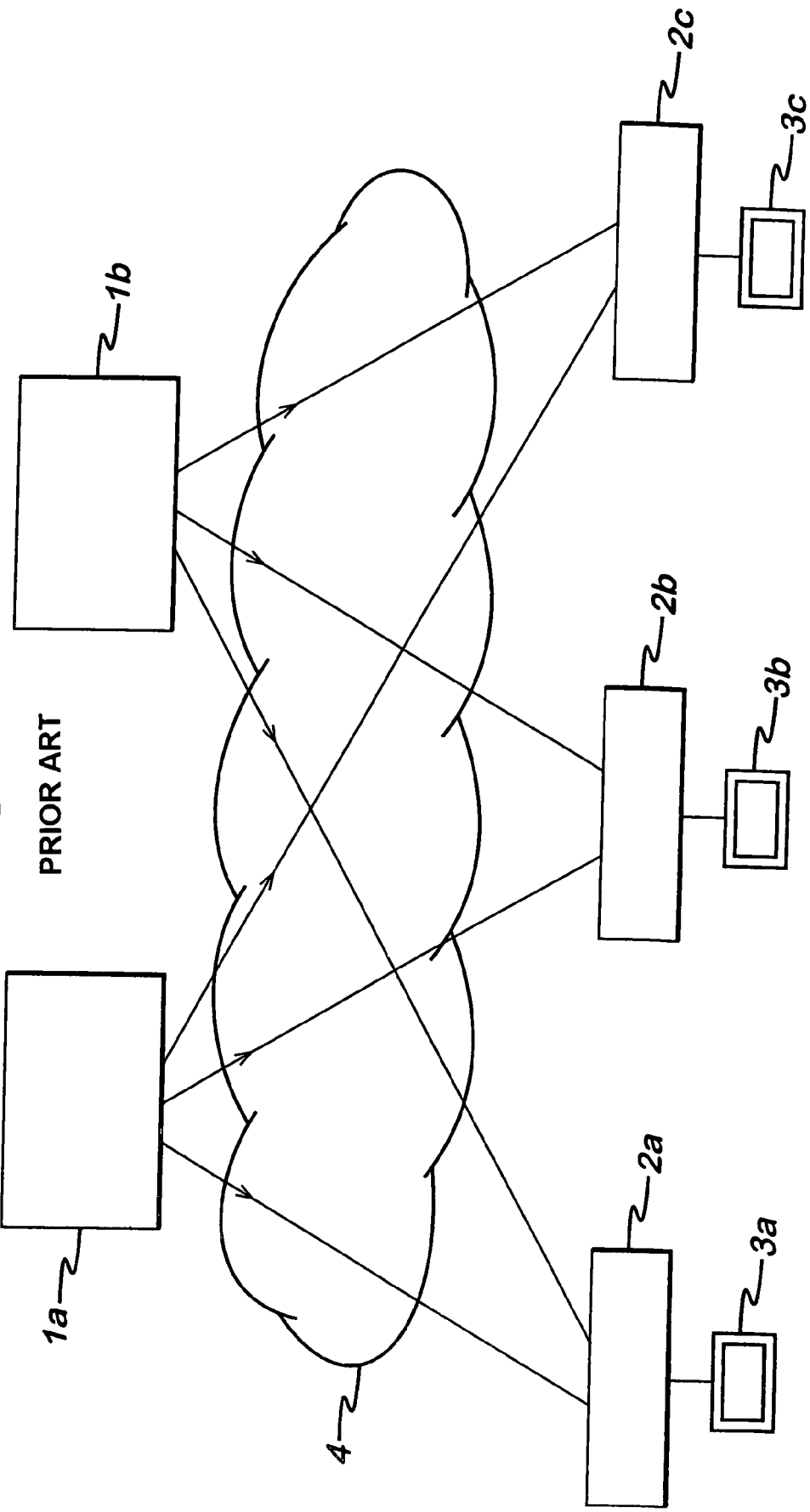

FIG. 1 shows a typical prior art television transmission system. 1a and 1b are connected to a network 4 and are providers of enhanced content intended for display on televisions 3a-c. The enhanced content requires decoding before they can be displayed on the televisions. 2a, 2b and 2c are decoders, also connected to network 4, which receive the enhanced content from the enhanced content providers and decode the signals for display on televisions 3a-c. In current systems, decoders 2a-c can each be of a different type. Each type of decoder requires enhanced content to be input in a format specific to the decoder type. In the absence of any intermediate devices for reformatting the enhanced content, it follows that the enhanced content providers 1a and 1b, when transmitting data to a particular type of decoder, must transmit the data in the format recognised by that type of decoder. It also follows that if an enhanced content provider wishes to provide several types of decoder with enhanced content, then each signal must be in the correct format for the decoder type to which it is intended to transmit the signal.

The system described above could be an interactive television system. The term enhanced content is used herein to refer to content available to be played out at the request of a user onto a television screen. The enhanced content could be in addition to the basic video data of a television programme or movie. It may consist of information, such as news, television schedules, or weather reports, or may invite a response from a user.

The arrangement of FIG. 1 has a number of shortcomings.

Firstly, an enhanced content provider must know, in advance of formatting a signal, the type of decoder for which the video signal is intended.

Secondly, the signals must be created in a format specific to the decoder type for which it is intended. This creates considerable costs and complications at the enhanced content provider. A separate channel is required for the format corresponding to each decoder type which is served by the signal provider.

In addition, the signal provider requires a direct connection to each decoder type served by the signal provider, and similarly, each decoder type needs a direct connection to signal providers from which the enhanced content are to be received.

Moreover, each decoder may need to receive many enhanced content signals from different providers, for example so that a viewer has available to him several TV channels which include enhanced content.

It is desirable that there should be a simplified way for signals to be transmitted between enhanced content providers and decoders.

According to one aspect of the present invention there is provided a signal formatting apparatus for use in a television transmission system, the apparatus comprising: an enhanced content input for receiving enhanced content streams in a predefined input format; a plurality of enhanced content outputs for outputting enhanced content data in a plurality of formats for transmission to receivers of respective types; and a signal formatter for forming the enhanced content data by processing the enhanced content streams to put each of the enhanced content streams in the respective format.

According to another aspect of the present invention there is provided a method for formatting enhanced content signals in a television transmission system, the method comprising receiving enhanced content streams in an input format; processing the enhanced content streams to form enhanced content data in a plurality of output formats; and transmitting the enhanced content data in a respective format to receivers of a respective type.

Suitably each enhanced content stream is provided by a content provider in a respective predefined format. The content providers may include content listings generators which generate a listing of the content of the enhanced content stream for transmission to receivers, for example to provide the receivers with program guides.

The receivers are suitably decoders such as set-top boxes.

Other preferred features of the present invention are set out in the dependent claims.

Figure 2:
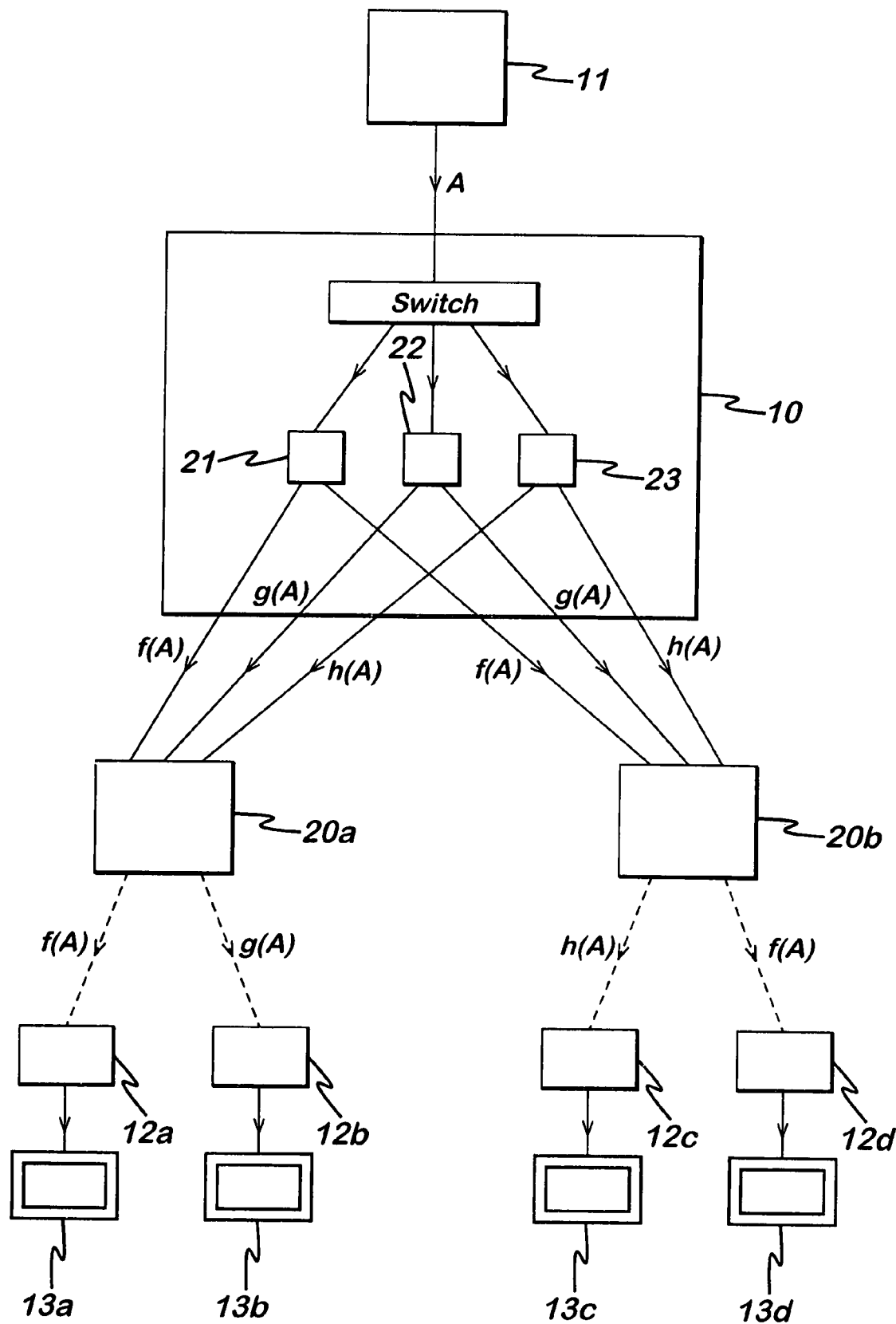
Figure 3:
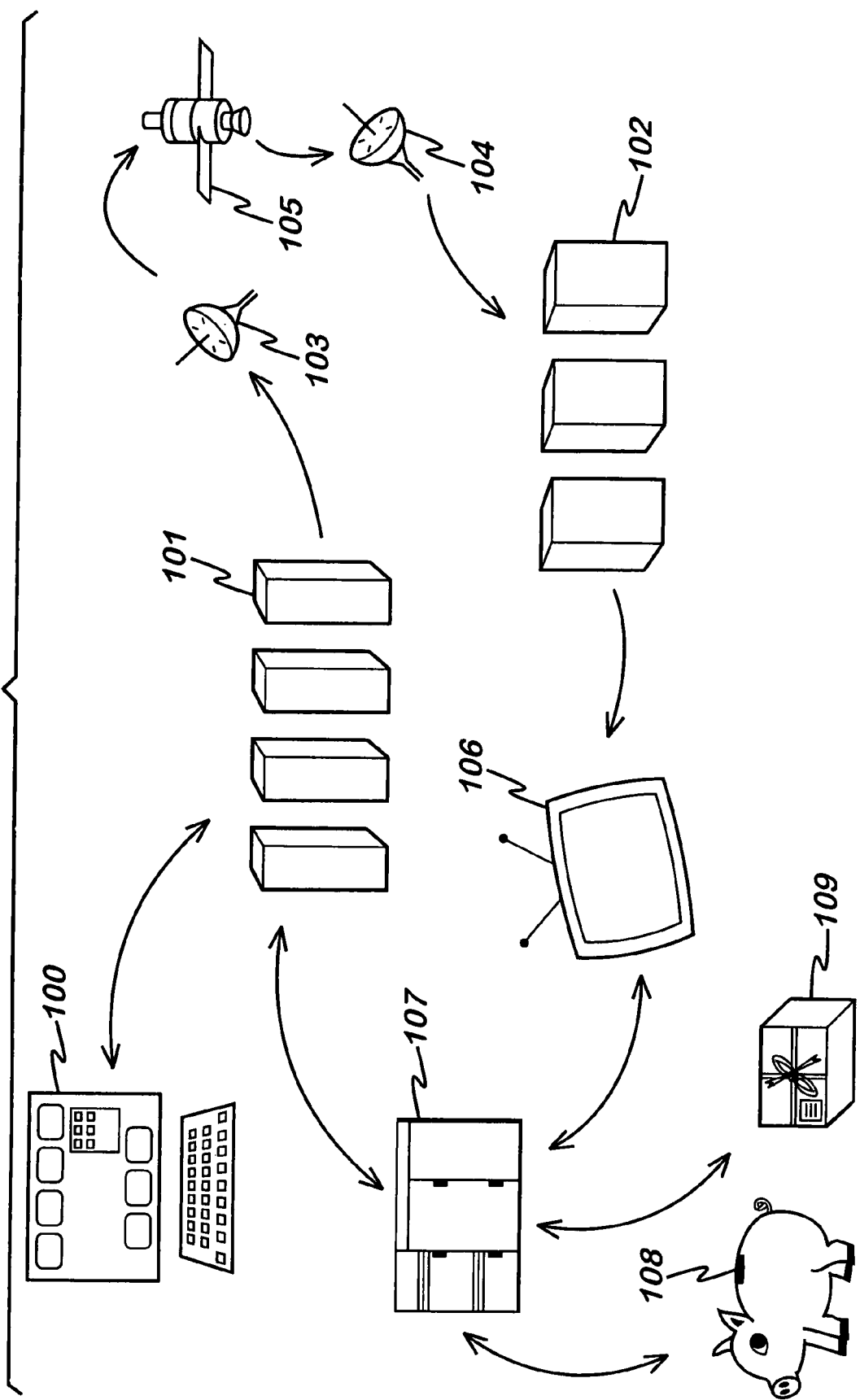

The invention will now be described by way of example with reference to the accompanying drawings in which:

FIG. 1 shows a prior art television transmission system;
FIG. 2 shows a television transmission system; and
FIG. 3 shows an interactive television network.

In the system of FIG. 2, enhanced content provider 11 transmits an enhanced content signal A towards a signal formatting apparatus 10. The signal formatting apparatus 10 is capable of receiving enhanced content in a generic format. The enhanced content signal A is in the generic format that can be received by the signal formatting apparatus 10. The generic format could suitably be XML.

The signal formatting apparatus 10 can receive concurrently signal A sent by content provider 11, and signals in the generic format sent by any additional content providers in the system. Having received the signal A, the signal formatting apparatus 10 then converts the signal into a format f(A) that can be read by decoders 12a and 12d (in the example of FIG. 2), and into a format g(A) that can be read by decoder 12b, and into a format h(A) that can be read by decoder 12c. The formats f(A), g(A) and h(A) could suitably be, for example, HTML and/or Java, or Flow files.

Signal formatting apparatus 10 comprises a switch 20 which receives all enhanced content signals transmitted to the signal formatting apparatus. The switch 20 then transmits a signal to each of a plurality of encoders 21, 22, 23. Each encoder 21, 22, 23 is associated with a decoder type 12a-d and converts its received signal into a format that can be read by that decoder type. Each formatted signal f(A), g(A) and h(A) is then transmitted from an encoder 21, 22, 23 to one or more local distribution units 20a and 20b.

The distribution units 20a and 20b can transmit the formatted signals towards the decoder types with which they are compatible. Thus each decoder in the system can receive a single enhanced content signal (f(A), g(A) or h(A)), the enhanced content signal being in a format compatible with the decoder and the enhanced content signal containing data received at the signal formatter from one or more content providers 11 in the system. In the current example, decoders 12a and 12d receive encoded signal f(A), decoder 12b receives signal g(A), and 12c receives h(A). Each decoder 12a-d then decodes the enhanced content signal it receives and can transmit the decoded signal to be displayed on a television 13a-13d.

FIG. 3 shows an example of a broadcast network in which the present system may be employed.

The network shown in FIG. 3 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 3.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102. to ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. Alternatively, triggers can be arranged to be sent automatically at pre-determined times during a television event. In this case, the MCM has access to a time schedule and on the basis of this schedule, sends triggers to decoders at the times when it is desired for the interactive content to be played out. For instance, a TV programme might start at 7.30 p.m., and triggers could then be sent automatically from the MCM 102 at 7.31 p.m., 7.35 p.m., 7.42 p.m. and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking, place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfil purchases or issue prizes.

Editors at the Edit Suites 100 can communicate with the TMS 107 via PMC 101 in order to determine how the TMS should react to responses sent from subscribers.

In the network of FIG. 3, the Playout Management Centre 101 may comprise the signal formatting apparatus 10 of FIG. 2.

In a system as described above with reference to FIG. 3, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings.

In the network of FIG. 3, the Playout Management Centre 101 may comprise the signal formatting apparatus 10 of FIG. 2.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A television transmission system comprising:
   a signal formatter configured to receive an enhanced content stream in a predefined input format, and to process the enhanced content stream to put the enhanced content stream into a plurality of output formats that comprise at least a first output format, a second output format, and a third output format; and
   a distribution unit, wherein the signal formatter is configured to output to the distribution unit the enhanced content stream in the first output format, the second output format, and the third output format, wherein the distribution unit is configured to distribute the enhanced content stream in the first output format, the second output format, and the third output format to receivers of respective format types; and wherein the distribution unit is further configured to distribute to the receivers at least one trigger indicating to the receivers when to play out the enhanced content relative to a video stream.

2. The system according to claim 1 wherein the television transmission system is an interactive television system.

3. The system according to claim 1 wherein the receivers are embodied in a set-top boxes.

4. The system according to claim 1 wherein the enhanced content stream received at the signal formatter is received from an enhanced content provider.

5. The system according to claim 4 wherein the enhanced content provider is positioned remotely from the signal formatter.

6. The system according to claim 1 wherein the receivers are positioned remotely from the signal formatter.

7. The system according to claim 1 wherein the predefined input format is XML.

8. The system according to claim 1 wherein the output formats include HTML, Java and Flow files.

9. The system of claim 1, comprising the signal formatter configured to output to a plurality of distribution units the enhanced content stream in the first output format, the second output format, and the third output format for distribution to receivers of respective format types.

10. A method, comprising:
receiving an enhanced content stream at a signal formatter in a predefined input format;
at the signal formatter, processing the enhanced content stream to put the enhanced content stream into a plurality of output formats comprising at least a first output format, a second output format, and a third output format; and
transmitting to a distribution unit the enhanced content stream in the first output format, the second output format, and the third output format to receivers of respective format types;
at the distribution unit, distributing to the receivers at least one trigger indicating to the receivers when to play out the enhanced content relative to a video stream.

11. A method as claimed in claim 10, wherein the predefined input format is XML.

12. A method as claimed in claim 10 wherein the output formats include HTML, Java and Flow files.

* * * * *